United States Patent
Fujiwara (10) Patent No.: US 7,855,532 B2
(45) Date of Patent: Dec. 21, 2010

(54) POWER SUPPLY CIRCUIT WITH CONTROL SWITCHES TO VOLTAGE MULTIPLIER HAVING SAME FREQUENCY AS CLOCK

(75) Inventor: Hirofumi Fujiwara, Shiga (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 774 days.

(21) Appl. No.: 11/808,105

(22) Filed: Jun. 6, 2007

(65) Prior Publication Data
US 2007/0285151 A1 Dec. 13, 2007

(30) Foreign Application Priority Data
Jun. 8, 2006 (JP) ............... 2006-159845

(51) Int. Cl.
*H02J 7/00* (2006.01)
(52) U.S. Cl. .................. 320/140; 320/128; 363/49; 363/59; 323/271
(58) Field of Classification Search ............. 320/138, 320/140; 323/908
See application file for complete search history.

(56) References Cited

U.S. PATENT DOCUMENTS

| | | | | |
|---|---|---|---|---|
| 5,168,174 A | * | 12/1992 | Naso et al. | 327/540 |
| 6,034,508 A | * | 3/2000 | Chang | 320/138 |
| 6,069,518 A | * | 5/2000 | Nakai et al. | 327/535 |
| 6,084,387 A | * | 7/2000 | Kaneko et al. | 323/281 |
| 6,259,612 B1 | * | 7/2001 | Itoh | 363/60 |
| 6,369,809 B1 | * | 4/2002 | Shimoda et al. | 345/211 |
| 7,560,903 B2 | * | 7/2009 | Thrap | 320/166 |
| 2005/0047181 A1 | * | 3/2005 | Yamamoto et al. | 363/60 |
| 2005/0110469 A1 | * | 5/2005 | Inaba et al. | 323/222 |
| 2005/0179424 A1 | * | 8/2005 | Mayumi | 323/282 |
| 2005/0189922 A1 | * | 9/2005 | Maskatia et al. | 320/138 |
| 2005/0189983 A1 | * | 9/2005 | Sivero et al. | 327/536 |
| 2005/0213356 A1 | * | 9/2005 | Yanagida et al. | 363/59 |
| 2005/0253560 A1 | * | 11/2005 | Popescu-Stanesti et al. | 320/138 |
| 2006/0066552 A1 | * | 3/2006 | Morita | 345/94 |
| 2006/0132417 A1 | * | 6/2006 | Shigenobu et al. | 345/98 |
| 2006/0176718 A1 | * | 8/2006 | Itoh | 363/60 |

FOREIGN PATENT DOCUMENTS

JP 3487581 10/2003

* cited by examiner

*Primary Examiner*—Edward Tso
*Assistant Examiner*—Arun Williams
(74) *Attorney, Agent, or Firm*—McGinn IP Law Group, PLLC.

(57) ABSTRACT

A power supply circuit includes a first power supply configured to output a first voltage; a second power supply provided separately from the first power supply to output a second voltage; and a boosting circuit configured to use the first voltage as an input voltage to boost the input voltage toward a target voltage. The target voltage has a voltage width, and when an output voltage of the boosting circuit exceeds an upper limit of the target voltage, the input voltage is switched the first voltage of the first power supply to the second voltage of the second power supply.

19 Claims, 6 Drawing Sheets

POWER SUPPLY CIRCUIT WITH CONTROL SWITCHES TO VOLTAGE MULTIPLIER HAVING SAME FREQUENCY AS CLOCK

BACKGROUND OF THE INVENTION

1. Field of the Invention

The present invention relates to a power supply circuit including a boosting circuit, and more specifically, to a power supply circuit suitable to be built in a driver IC that drives a display unit of a mobile terminal.

2. Description of Related Art

Display devices of mobile data terminals such as a mobile phone and a PDA (Personal Digital Assistants) are configured to operate at a low power supply voltage for reduction of power consumption. On the other hand, the display device adapted to display processed data often needs a voltage higher than those supply voltages. Therefore, generally, a circuit adapted to drive the display device has an internal power supply circuit that generates a necessary drive voltage by boosting the power supply voltage.

Figure 1:
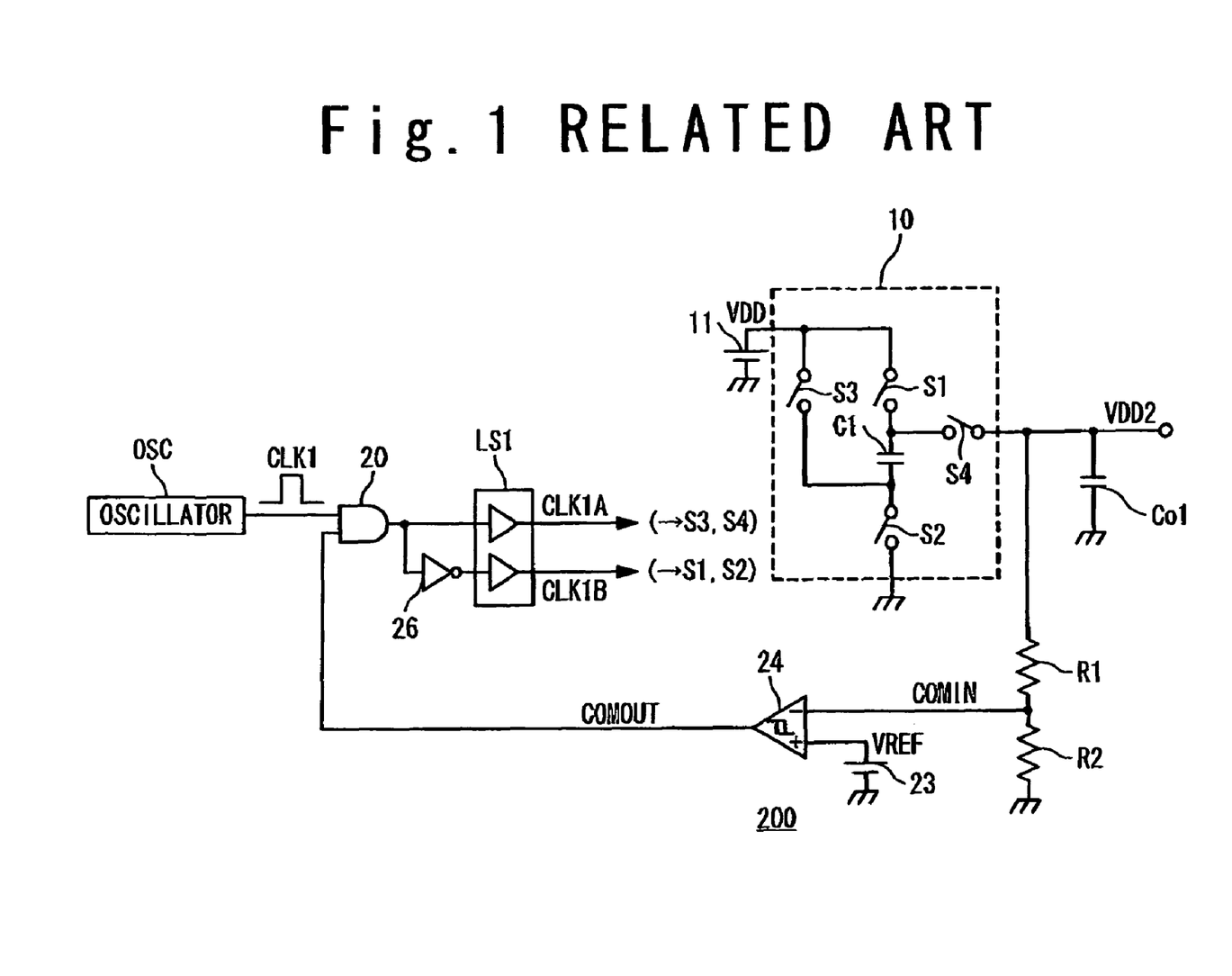
FIG. 1 is a circuit diagram of a conventional power supply circuit.
Figure 2:
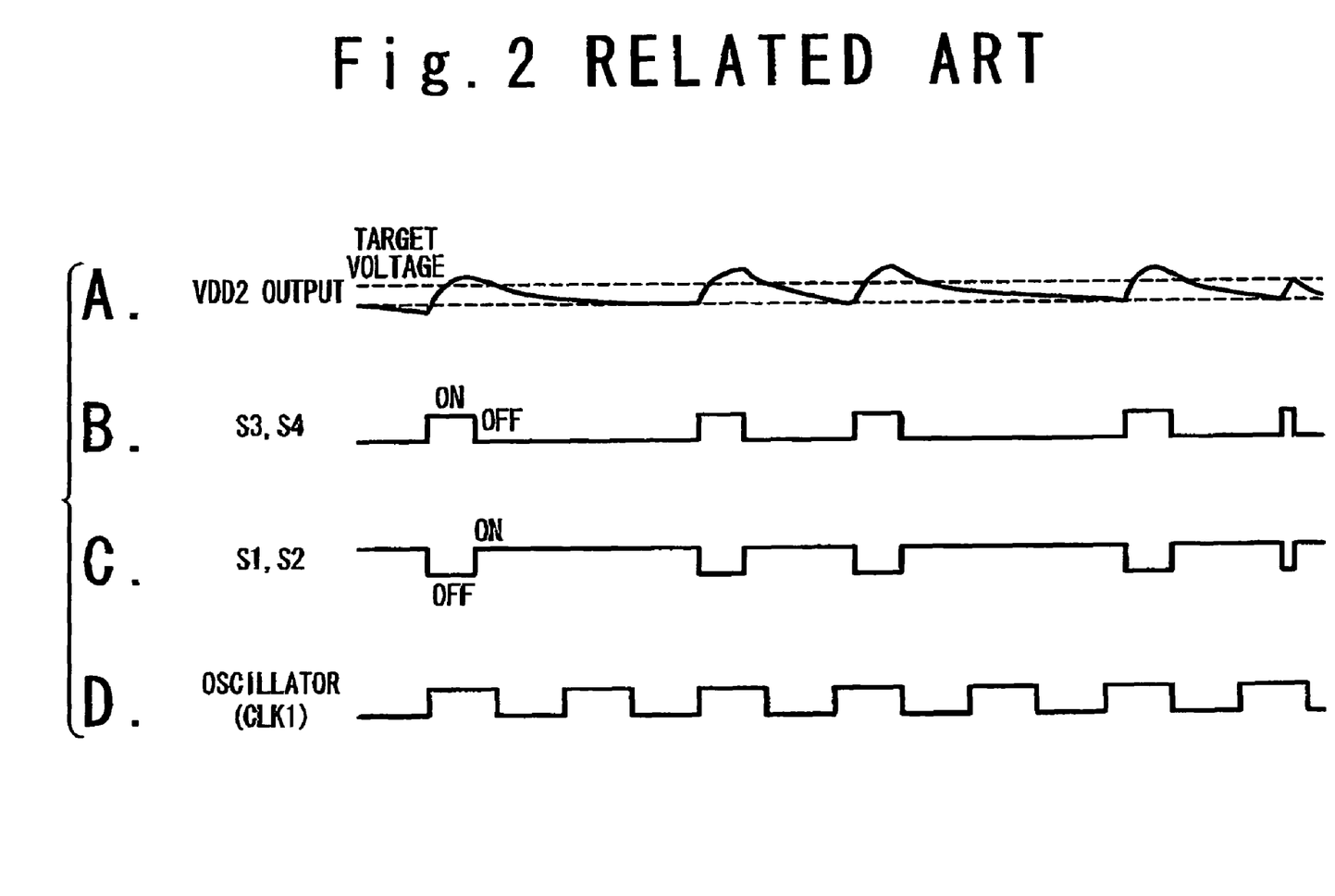
FIGS. 2A to 2D are operation waveform diagrams of the conventional power supply circuit.

An example of such a power supply circuit is shown in Japanese Patent No. 3487581. This power supply circuit 200 is of a charge pump type, and as shown in FIG. 1, the power supply circuit 200 has a charge pump 10 adapted to boost an output voltage of a first power supply 11 (its voltage is designated as VDD) and a smoothing capacitor Co1 adapted to smooth an output voltage VDD2 of this charge pump 10. The charge pump 10 is composed of switches S1 to S4 and a capacitor C1.

Further, the power supply circuit 200 has voltage dividing resistors R1 and R2 that resistance-divide an output voltage VDD2, a comparator 24 such that a connection node of the resistors R1 and R2 (its voltage is designated as COMIN) is connected to its inverting input terminal and a stabilized power supply 23 (its voltage is designated as VREF) is connected to its non-inversion input and that has thereby a hysteresis characteristic.

In addition, the power supply circuit 200 has an AND gate 20 that receives an output of the comparator 24 (its voltage is designated as COMOUT) and a clock signal CLK1 from an oscillator OSC as inputs, a NOT gate 26 that inverts the output of the AND gate 20, and a level shift circuit LS1 that generates a clock signal CLK1A and a clock signal CLK1B obtained by shifting the output of the AND gate 20 and the output of the NOT gate 26, respectively.

Next, a boosting operation of a conventional power supply circuit 200 will be described. Switches S1 and S2 are turned on when the clock signal CLK1B is in an H level, and switches S3 and S4 are turned on when the clock signal CLK1A is in the H level. When the output of the AND gate 20 is in an L level, the charge pump 10 is changed to a state of charge (the switches S1 and S2 are turned on, the switches S3 and S4 are turned off, and the capacitor C1 is changed to the state of charge). When the output of the AND gate 20 is in the H level, the charge pump 10 is changed to a state of discharge (the switches S1 and S2 are turned off, the switches S3 and S4 are turned on, and the capacitor C1 is changed to the state of discharge). Through repetition of charging/discharging operations of this capacitor C1, the output voltage VDD2 of the power supply circuit 200 is raised toward a voltage of two times the power supply voltage VDD.

A target voltage of the output voltage VDD2 is a voltage lower than two times of the power supply voltage VDD, which is set based on ((R1/R2)+1)×VREF. For example, what is necessary to set the target voltage to 5.5 V is just to set R1=R2 if VREF=2.75V. When the output voltage VDD2 reaches the target voltage COMIN>VREF holds and an output voltage COMOUT of the comparator 24 is changed from the H level to the L level. By doing so, an output of the AND gate is changed to the L level at the same time, and the charge pump 10 halts the boosting operation and is changed to the state of charge. This state is a pulse skip state.

When the output voltage VDD2 is lower than the target voltage, COMIN<VREF is met and the output voltage COMOUT of the comparator 24 is changed to the H level from the L level. Since the output voltage COMOUT is in the H level, the clock signal CLK1 becomes an output of the AND gate 20, as it is. Thus, a switching operation of the switches S1 to S4 in response to the clock signals CLK1A and CLK1B that are level shifted are restarted, the charging and discharging operations of the capacitor C1 are repeated, and the output voltage VDD2 is raised toward the target voltage again.

In the above-mentioned operation, a pulse skip operation is an operation in which the charge pump 10 intending to raise the output voltage VDD2 to two times of the power supply voltage VDD is controlled based on the clock signals CLK1A and CLK1B adapted to operate the switches S1 to S4 through negative feedback. After the output voltage VDD2 reaches the target voltage that is lower than the two times of the power supply voltage VDD, the boosting operation of the voltage is stopped and the output voltage VDD2 is adjusted to be in a predetermined range.

FIGS. 2A to 2D are operating waveform diagrams of the conventional power supply circuit 200 in the pulse skip state. As shown by waveforms of the switches S1 to S4 in FIGS. 2B and 2C, on-off periods of the switches S1 to S4 become unfixed in frequency with respect to the clock signal CLK1 because of a decreasing curve of the output voltage VDD2. In other words, since a load current of the output voltage VDD2 is not constant, a gradient of the decreasing curve of the output voltage VDD2 is not constant. Therefore, the on-off periods of the switches S1 to S4 do not become constant. On the other hand, since a current that charges or discharges the capacitor C1 flows through the switches S1 to S4 transiently, the switches S1 to S4 are required to have low impedances. For this reason, in a chip layout, the switches S1 to S4 are very large in size. Thus, peak values of the currents to drive the switches S1 to S4 and peak values of their conduction currents become large. The unfixed frequency operations of these large switches S1 to S4 become noise sources on the chip, and it is likely for them to induce erroneous operations and characteristics degradation in adjacent elements and circuits. For example, when the output voltage VDD2 is stabilized by a regulator and is used by an other circuit, the ripple cannot be fully removed depending on a frequency characteristic of a ripple removal rate of the regulator, since a frequency of a noise or ripple comes out of a design frequency band in which the ripple removal rate is excellent because of the unfixed frequency operation.

SUMMARY

In a first embodiment of the present invention, a power supply circuit includes a first power supply configured to output a first voltage; a second power supply provided separately from the first power supply to output a second voltage; and a boosting circuit configured to use the first voltage as an input voltage to boost the input voltage toward a target voltage. The target voltage has a voltage width, and when an output voltage of the boosting circuit exceeds an upper limit of the target voltage, the input voltage is switched the first voltage of the first power supply to the second voltage of the second power supply.

Also, in a second embodiment of the present invention, a power supply circuit includes a first power supply configured to output a first voltage; a second power supply provided separately from the first power supply to output a second voltage; and a charge pump operating in synchronization with a clock signal to use the first voltage as an input voltage to boost the input voltage to a target voltage which is equal to or lower than a product of the first voltage and an integer. The target voltage has a voltage width, and the input voltage is switched to the second voltage of the second power supply which outputs a product of an output voltage of the charge pump and an inverse number of the integer, from when the output voltage of the charge pump exceeds an upper limit of the target voltage, to when the output voltage becomes below a lower limit of the target voltage.

According to the present invention, since the control signal used to control the switches of the charge pump always has the same frequency as that of the clock signal, all the switches continue to be operated at a fixed frequency irrespective of the magnitude of a load and do not fall into the unfixed frequency operation; therefore, induction of occurrence of the noise can be prevented. By this function, induced erroneous operations and characteristics degradation in adjacent elements and circuits in a semiconductor integrated circuit that constitutes the power supply circuit can be prevented.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

Figure 3:
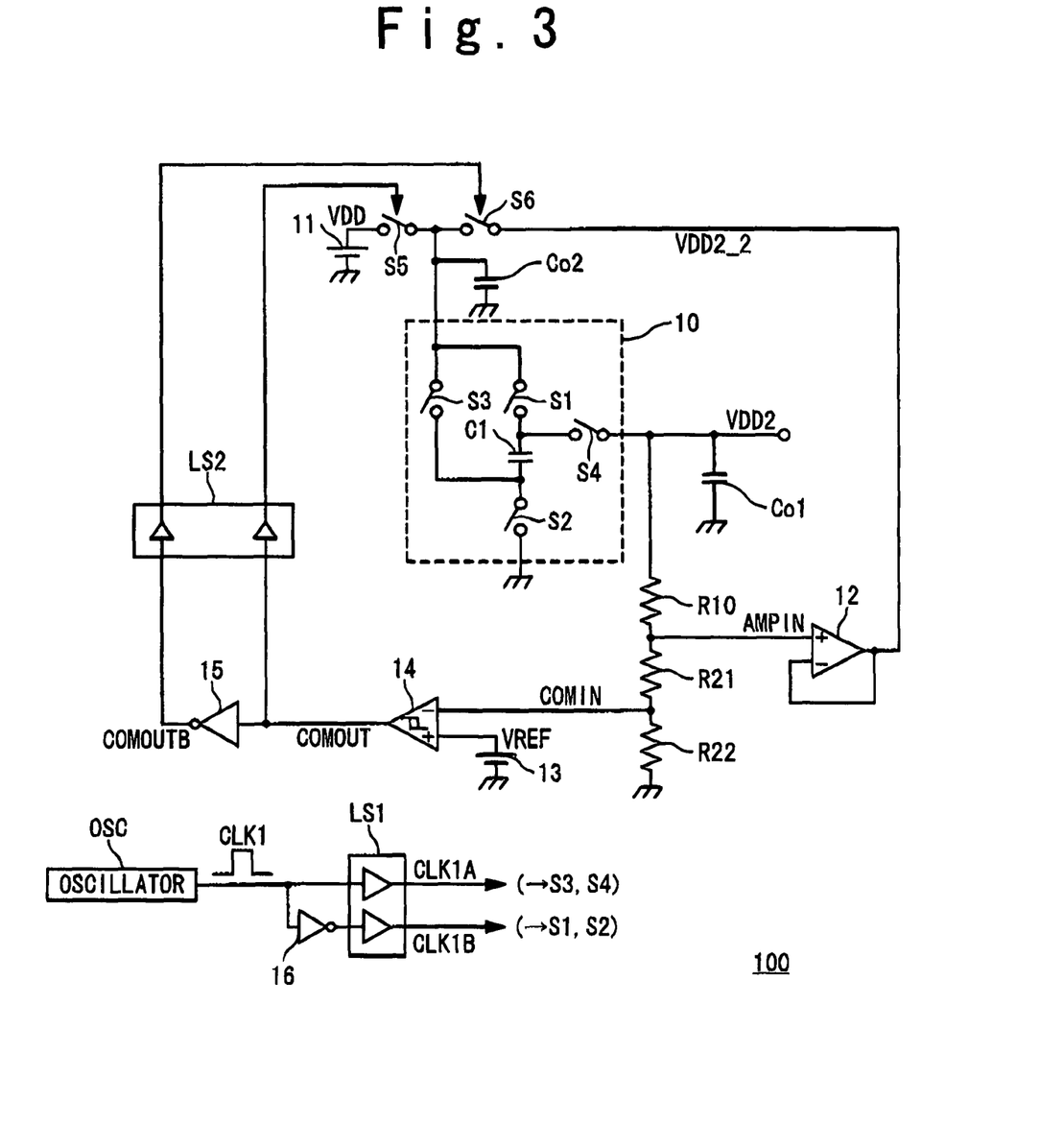
FIG. 3 is a circuit diagram of a power supply circuit according to a first embodiment of the present invention.

Hereinafter, a power supply circuit of the present invention will be described with reference to the attached drawings. FIG. 3 shows a power supply circuit 100 according to a first embodiment of the present invention. As shown in FIG. 3, the power supply circuit 100 includes a charge pump 10 that boosts an input voltage VDD to two times and that is composed of switches S1 to S4 and a capacitor C1. Also, the power supply circuit 100 includes a smoothing capacitor Co1 adapted to smooth the output voltage VDD2 and a capacitor Co2 functioning as a second power supply connected to an input of the charge pump 10. The power supply circuit 100 further includes resistors R10, R21, and R22 adapted to divide the output voltage VDD2 in accordance with a resistance ratio, a voltage follower buffer 12 to whose non-inversion input a connection node of the resistors R10 and R21 is connected, and a comparator 14 to whose inversion input a connection node between the resistors R21 and R22 is connected and to whose non-inversion input a stabilized power supply 13 is connected. The voltage at the connection node of the resistors R10 and R21 is designated as AMPIN, and the voltage of the connection node between the resistors R21 and R22 is designated as COMIN. The voltage of the stabilized power supply 13 is designated as VREF.

Still further, the power supply circuit 100 includes a level shift circuit LS2 adapted to level-shift an output of the comparator 14. The voltage of the comparator 14 is designated as COMOUT. The power supply circuit 100 further includes a NOT gate 15 adapted to invert the output of the comparator 14 to generate a signal COMOUTB, a switch S5 adapted to intermittently connect a first power supply 11 and the charge pump 10 based on a level shifted signal COMOUT, and a switch S6 adapted to intermittently connect the output of the buffer 12 and the charge pump 10 based on the level shifted signal COMOUTB.

Also, the power supply circuit 100 includes a NOT gate 16 adapted to invert a clock signal CLK1 from an oscillator OSC, and a level shift circuit LS1 that level-shifts the clock signal CLK1 and the output of the NOT gate 16 and generates a clock signal CLK1A and a clock signal CLK1B adapted to control closing/opening of the switches S1 to S4.

A ratio of the resistors R10, R21, and R22 is set as (R21+R22):R10=1:1 so that voltage AMPIN may be ½ of the output voltage VDD2. A target voltage of the output voltage VDD2 is set to (((R10+R21)/R22)+1)×VREF. For example, when the target voltage is intended to be set to 5.5 V, what is necessary is just to set ((R10+R21)/R22)=4 when VREF=1.1 V. Thus, what is necessary more specifically is to establish R10:R21:R22=5:3:2 from a relation of (R21+R22):R10=1:1.

An operation of the power supply circuit 100 with the above-mentioned configuration will be described with reference to operational waveforms shown in FIGS. 5A to 5E. The switches S1 and S2 are turned on when the clock signal CLK1B is in an H level; the switches S3 and S4 are turned on when the clock signal CLK1A is in the H level. When the clock signal CLK1 is in the L level, the switches S1 and S2 are turned on and the switches S3 and S4 are turned off in the charge pump 10. Thus, the capacitor C1 is changed to a charging state. When the clock signal CLK1 is in the H level, the switches S1 and S2 are turned off and the switches S3 and S4 are turned on in the charge pump 10. Accordingly, the capacitor C1 is changed to a discharging state (see waveforms of CLK1 and S1 to S4 of FIGS. 5A to 5E. In this way, charging/discharging operations of the capacitor C1 are repeated always in synchronization with the clock signal CLK1, and the output voltage VDD2 of the power supply circuit 100 is adjusted to be within a predetermined range of a target voltage.

In case of COMIN<VREF, since the output voltage COMOUT of the comparator 14 is in the H level, the switch S5 is in the on state, and the switch S6 is in the off state. Therefore, the first power supply 11 functions as the input power supply of the charge pump 10 during an off period of the switch S6 shown in FIG. 5A.

When the output voltage VDD2 reaches the target voltage set by (R10+R21)/R22)+1)×VREF and COMIN>VREF is held, the voltage COMOUT is changed from the H level to the L level, so that the switch S5 is changed to the off state and the switch S6 is changed to the on state. Through these changes, the output of the buffer 12 is now connected to the input of the charge pump 10, and by an effect of the capacitor Co2 that will be described later, the capacitor Co2 functions as a second power supply. That is, the input power supply of the charge pump 10 is changed from the first power supply 11 to the capacitor Co2 functioning as the second power supply during an on period of the switch S6 shown in FIG. 5A. At this time, since the switches S1 to S4 continue to be turned on and off in synchronization with the clock signal CLK1, the pulse skip operation does not occur unlike a case of the conventional power supply circuit 200, even if the output voltage VDD2 exceeds the target voltage.

Figures 5A, 5B:
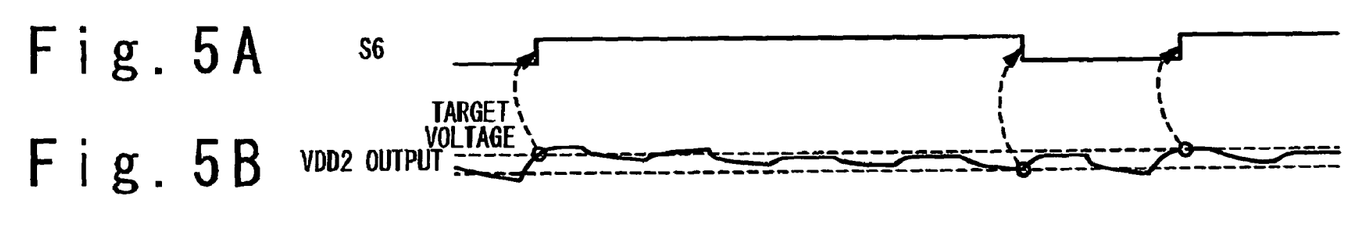
FIGS. 5A to 5E are operation waveform diagrams of the power supply circuit of the present invention.
Figure 5C:
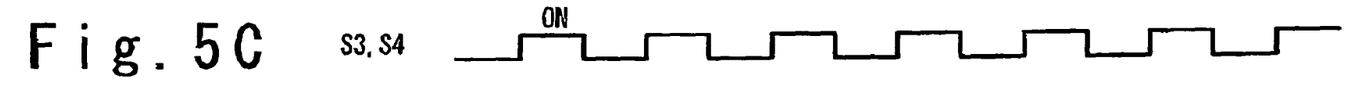
Figure 5D:
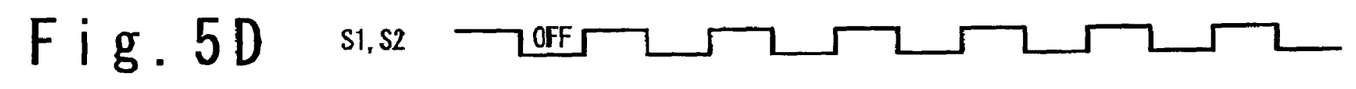
Figure 5E:
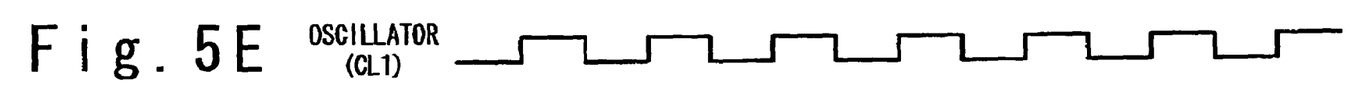

Actually, because of a hysteresis characteristic of the comparator 14, the target voltage of the output voltage VDD2 shown in FIG. 5B has a hysteresis width giving an upper limit and a lower limit shown by dashed lines. When the output voltage VDD2 is raised, the switch S5 is changed to the off state and the switch S6 is changed to the on state at a time when the output voltage VDD2 reaches the upper limit of the target voltage. Accordingly, the power supply of the charge pump 10 is changed from the first power supply 11 to the capacitor Co2 functioning as the second power supply.

The capacitor Co2 is charged by the first power supply 11 until the output voltage VDD2 reaches the upper limit of the target voltage. Therefore, although the voltage of the capacitor Co2 immediately after the switchover is almost equal to the voltage of the first power supply 11, the power supply capacity of the capacitor Co2 is smaller than that of the first power supply 11. Moreover, the capacitor Co2 immediately after the switchover is charged to a voltage that is obtained by dividing the output voltage VDD2 by the resistors R10, R21, and R22 (one-half of the output voltage VDD2) and is supplied through the buffer 12. For this reason, the quantity by which the output voltage VDD2 is raised in synchronization with the clock signal CLK1 is smaller than the quantity by which it is raised by the first power supply 11. The output voltage VDD2 decreases gradually through consumption by a load (not shown) connected to the charge pump 10 (see a VDD2 waveform in the on period of the switch S6 in FIG. 5A). Then, at a time when the output voltage VDD2 goes below the lower limit of the target voltage, the switch S5 is changed to the on state and the switch S6 is changed to the off state. Accordingly, the first power supply 11 functions as the power supply of the charge pump 10. Therefore, the output voltage VDD2 also increases gradually (see the VDD2 waveform in the off period of the switch S6 of FIG. 5A).

The above operations can be summarized as follows: the output voltage VDD2 is compared with the target voltage, and the switchover operation of the switches S5 and S6 is performed to switch the input power supply of the power supply circuit 100, whereby the voltage level of the output voltage VDD2 is adjusted to be within a predetermined range of the target voltage without generating a pulse skip operation of an unfixed frequency generated in the conventional power supply circuit 200.

Here, an effect of the capacitor Co2 as the second power supply will be described by taking as an example, a case where the switch S6 is in the on state. When there is no capacitor Co2, the charging current to the capacitor C1 is flows through an output transistor (not shown) of the buffer 12, the switch S6, and the switch S1 in this order. In this case, impedances of the output transistor of the buffer 12, the switch S6, and the switch S1 must be made smaller. If the impedance is large, a synthetic impedance of the output transistor of the buffer 12 plus the switch S6 plus switch S1 and the charging current to the capacitor C1 cause an output voltage VDD2_2 of the buffer 12 to drop before it is inputted into the capacitor C1. If it has dropped, the capacitor C1 can not be charged to the target voltage. In order to reduce the impedances of the output transistor and the switch S6, it is necessary to enlarge the elements, which may provide new noise sources.

When the capacitor Co2 is inserted, the switch S5 is in the on state until the output voltage VDD2 reaches the target voltage. Therefore, the capacitor Co2 is in a state of being fully charged by the first power supply 11. When the output voltage VDD2 reaches the target voltage, the switch S5 is turned off, and the switch S6 is turned on, so that almost the entire charging current to the capacitor C1 is supplied from the capacitor Co2. That is, the capacitor Co2 will function as the second power supply. This is because, when being viewed from the capacitor C1, a synthetic impedance formed by the switch S1 plus a wiring to the capacitor Co2 is smaller than a synthetic impedance formed by the switch S1 plus the switch S6 plus the amplifier output transistor. Thus, since almost the entire charging current is supplied from the capacitor Co2, it becomes unnecessary to consider a voltage drop caused by the output transistor of the buffer 12 and the switch S6. Therefore, the switch S5 and the switch S6 can be made smaller in size than the switches S1 to S4. This point is also an effect given by the capacitor Co2.

As described above, even if the switches S1 to S4 continue to be turned on and off in synchronization with the clock signal CLK1, since the power supply of the charge pump 10 is switched from the first power supply 11 to the capacitor Co2 functioning as the second power supply from a time when the output voltage VDD2 reaches the upper limit of the target voltage, the output voltage VDD2 can be adjusted within a predetermined range of the target voltage without performing the pulse skip operation, unlike the conventional power supply circuit 200. Since the switches S1 to S4 continue to be turned on and off at a constant frequency in synchronization with the clock signal CLK1, the operations of the switches S1 to S4 do not function as noise sources on the chip. Thus, this configuration can prevent erroneous operations and characteristics degradation in adjacent elements and circuits from being induced.

Figure 4:
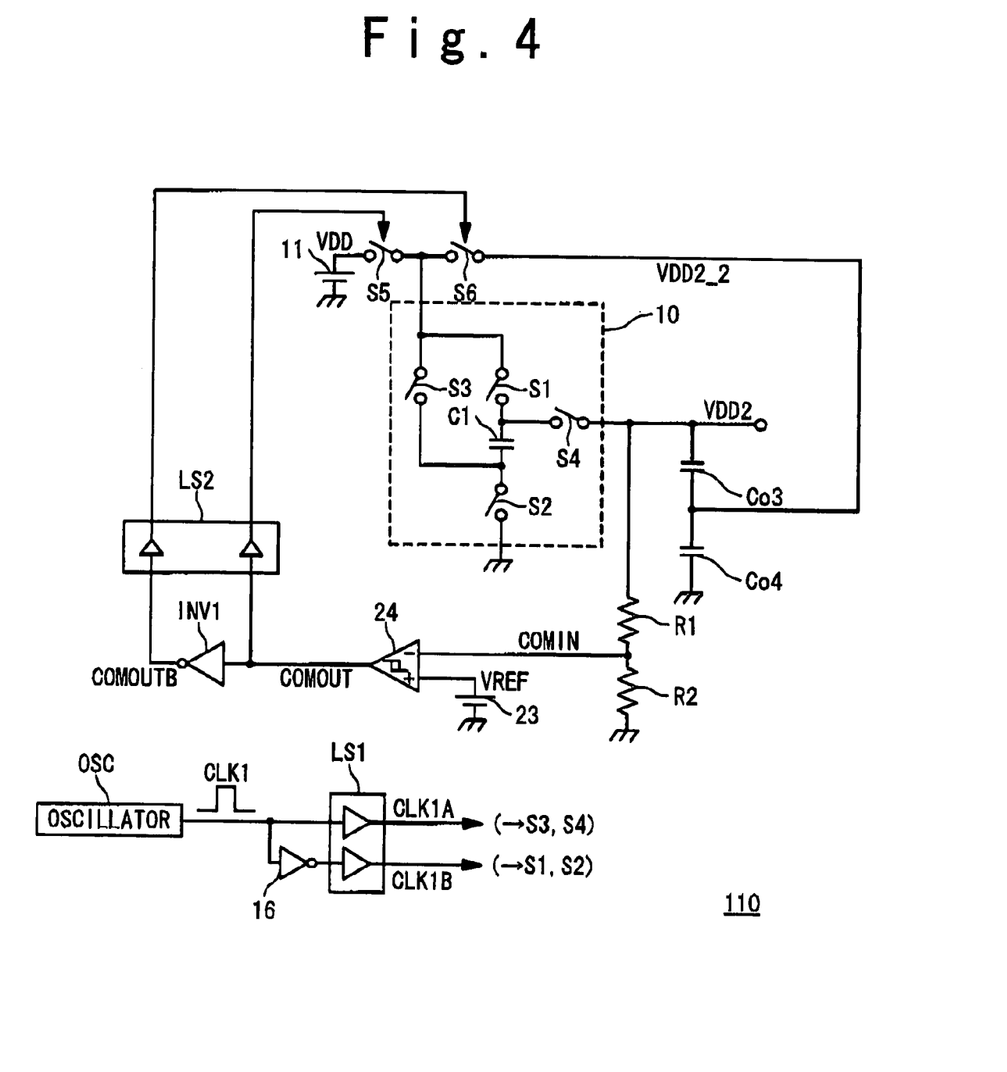
FIG. 4 is a circuit diagram of the power supply circuit according to a second embodiment of the present invention and FIG. 4A shows another variation.

Next, a second embodiment of the present invention will be described. FIG. 4 shows a power supply circuit 110 according to the second embodiment of the present invention. A main different point from FIG. 1 is that instead of the smoothing capacitor Co1, capacitors Co3 and Co4 of the same capacitance are connected in series, and the voltage at the connection node between the capacitors Co3 and Co4 is designated as VDD2_2 and is used as an input power supply of the charge pump 10 with a help of the switch S6. It should be noted that the capacitor Co2 and the buffer 12 are eliminated, and instead of the voltage dividing resistors R10, R21, and R22 of FIG. 3, voltage-dividing resistors R1 and R2 are used. Therefore, the target voltage of the output voltage VDD2 is equal to or less than two times of the power supply voltage VDD and is set by ((R1/R2)+1)×VREF.

Moreover, the constants of the capacitors Co3 and Co4 are set to approximately equal to or more than two times those of the capacitors Co1 and Co2 of the power supply circuit 100 of FIG. 3. Thus, it is intended that a current supply capability to the charge pump 10 may be improved and the capacitors Co3 and Co4 may play a same effect as that of the capacitor Co2 in the first embodiment (FIG. 3). This is because when the constants of the capacitors Co3 and Co4 are equal to each other, series connection of them gives a synthetic capacity of one-half of the constant.

An operation of the power supply circuit 110 of the above-mentioned configuration will be described. The operation of the charge pump 10 and the switches S1 to S6 are not different from those of the power supply circuit 100 in the first embodiment. The power supply circuit 110 of FIG. 4 in the second embodiment is different from the power supply circuit 100 of the FIG. 3 in the following point. That is, when the switch S6 is turned on, almost the entire charging current to the capacitor C1 is supplied from the capacitor Co2 in the first embodiment, while the capacitor C1 is charged with charges stored in both the capacitors Co3 and Co4 in the second embodiment.

The second embodiment is the same as the first embodiment in that when the switch S5 is in the on state and a power is supplied from the first power supply 11, the capacitors Co3 and Co4 are charged with the boosted output voltage VDD2 and are used as the second power supply of the charge pump 10. A voltage that is divided by the capacitors Co3 and Co4 is almost one-half of the output voltage VDD2.

The power supply circuit 110 in the second embodiment cannot continue supplying a DC-like load current to a load (not shown) connected to its output for a long time. In such a case, the output voltage VDD2 soon drops below the target voltage lower limit, and the power supply circuit 110 will operate with the first power supply 11. However, the charging current to the capacitor C1 at the time of a light load is a transient current that an instantaneous peak current is large and the current gradually approaches zero, rather than a DC-like one. Therefore, when this transient current is averaged and converted to a DC current value, if the DC current is small, serially connected capacitors Co3 and Co4 functioning as the second power supply of the power supply circuit 110 in the second embodiment can charge the capacitor C1 enough.

In the second embodiment, the buffer 12 and the capacitor Co2 of the power supply circuit 100 in the first embodiment are not used. This is because only the switch S6 intervenes a charging path from the connection node between the capacitors Co3 and Co4 to the capacitor C1. Therefore, consideration of a voltage drop of the charging voltage to the capacitor C1 as in the first embodiment is not needed.

As described above, in case of a light load, the configuration of FIG. 4 in the second embodiment makes it possible to eliminate the circuit of the buffer 12 of FIG. 3 in the first embodiment. Accordingly, it becomes possible to reduce a size of chip layout compared to the circuit configuration of FIG. 3 in the first embodiment.

Figure 4A:
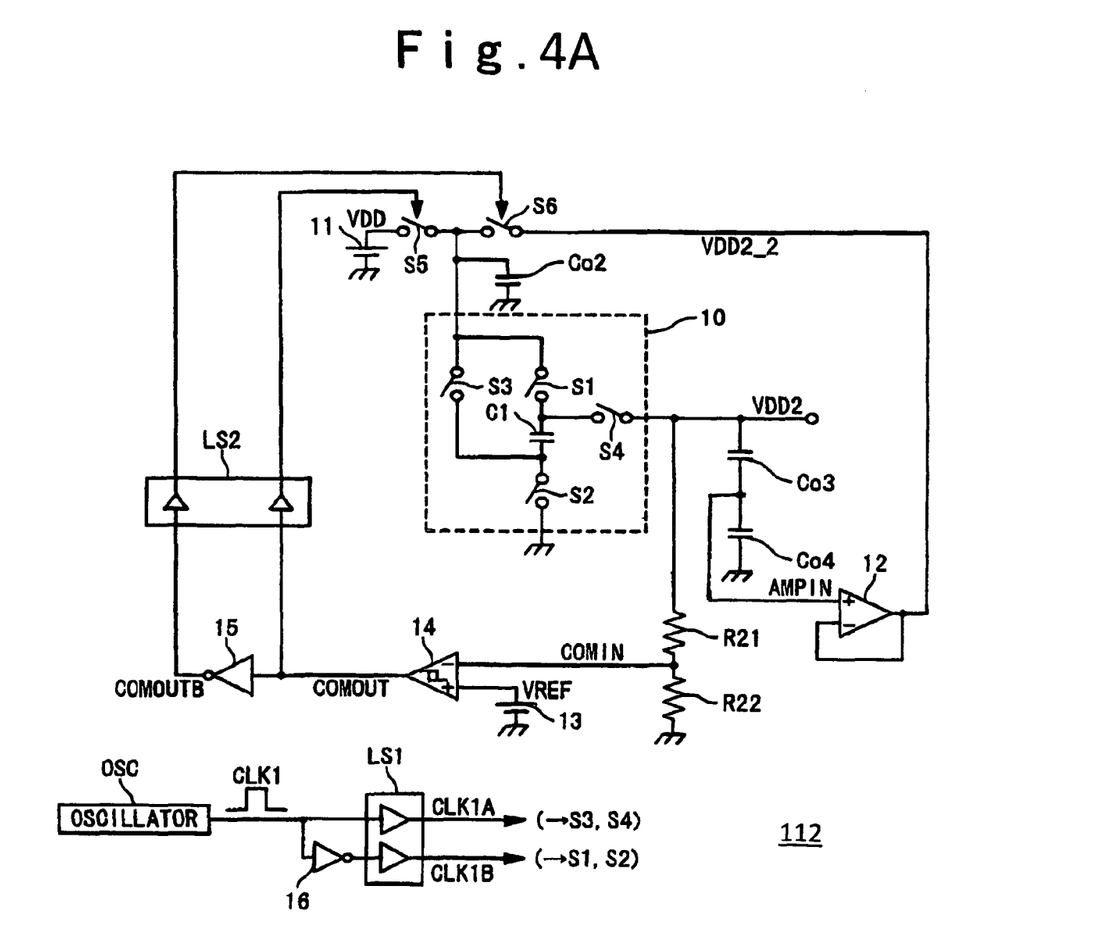

It should be noted that in the first and second embodiments, the embodiments have been described in which the charge pump 10 is used to boost the input voltage into two times of the power supply voltage. However, the present invention is not limited to this. For example, the charge pump may be used to boost the input voltage to three times of the power supply voltage if only a voltage obtained by resistance-dividing or capacitance-dividing the power supply voltage obtained through a boosting operation is reduced into one third. Moreover, as a modification example of the power supply circuit 110 in the second embodiment, although a reduction effect of the chip layout is not attained, the following configuration may be used. That is, a connection node between the capacitors Co3 and Co4 is connected to the switch S6 through the buffer 12 used in the power supply circuit 100 in the first embodiment, and the capacitor Co2 used in the power supply circuit 100 of the first embodiment, as shown in FIG. 4A.

Although the inventions has been described above in connection with several preferred embodiments thereof, it will be appreciated by those skilled in the art that those embodiments are provided solely for illustrating the invention, and should not be relied upon to construe the appended claims in a limiting sense.

What is claimed is:

1. A power supply circuit, comprising:
a first power supply configured to output a first voltage;
a second power supply provided separately from said first power supply to output a second voltage; and
a boosting circuit receiving an input voltage and providing a boosted voltage as an output voltage therefrom, said boosting circuit configured to use said first voltage as said input voltage to boost the input voltage toward a target voltage,
wherein said target voltage has a voltage width, and when said output voltage of said boosting circuit reaches an upper limit of said target voltage, the input voltage is switched from the first voltage of said first power supply to the second voltage of said second power supply,
wherein said boosting circuit boosts the input voltage N times (N is a number larger than 1), and
the second voltage is set not so as to exceed the upper limit of said target voltage when said boosting circuit boosts the second voltage N times.

2. The power supply circuit according to claim 1, wherein the second voltage is equal to or lower than the first voltage, and
a power supply capacity of said second power supply is lower than that of said first power supply.

3. The power supply circuit according to claim 1, wherein, when the upper limit of said target voltage is V and the second voltage is V2, $V2 \leq V/N$.

4. The power supply circuit according to claim 1, wherein said second power supply comprises a capacitor.

5. The power supply circuit according to claim 4, wherein said capacitor is charged with the output voltage of said boosting circuit.

6. The power supply circuit according to claim 5, wherein said capacitor is charged with a buffer output of a voltage obtained by dividing the output voltage of said boosting circuit by resistors.

7. The power supply circuit according to claim 5, wherein said capacitor is charged with a voltage obtained by dividing the output voltage of said boosting circuit by capacitors.

8. The power supply circuit according to claim 5, wherein said capacitor is charged with a buffer output of a voltage obtained by dividing the output voltage of said boosting circuit by a plurality of other capacitors.

9. The power supply circuit of claim 1, wherein, when said output voltage of said boosting circuit passes through a lower limit of said target voltage, the input voltage is switched back to the first power supply.

10. The power supply circuit of claim 1, wherein said boosting circuit comprises a plurality of switches that achieve the boosting toward the target value and said plurality of switches are synchronized with a clock signal.

11. A power supply circuit comprising:
a first power supply configured to output a first voltage;
a second power supply provided separately from said first power supply to output a second voltage; and
a charge pump operating in synchronization with a clock signal to use said first voltage as an input voltage to boost the input voltage to a target voltage which is equal to or lower than a product of said first voltage and an integer,
wherein said target voltage has a voltage width, and
the input voltage is switched to the second voltage of said second power supply which outputs a product of an output voltage of said charge pump and an inverse number of the integer, from when the output voltage of said charge pump reaches an upper limit of said target voltage, to when the output voltage becomes below a lower limit of said target voltage.

12. The power supply circuit according to claim 11, wherein said second power supply comprises a capacitor.

13. The power supply circuit according to claim 12, wherein said capacitor is charged with a buffer output of a voltage obtained by dividing the output voltage of said boosting circuit by resistors.

14. The power supply circuit according to claim 12, wherein said capacitor is charged with a voltage obtained by dividing the output voltage of said boosting circuit by capacitors.

15. A power supply circuit, comprising:
- a first power supply outputting a first voltage;
- a second power supply provided separately from said first power supply to output a second voltage; and
- a boosting circuit that receives a voltage as an input and provides a boosted voltage as a boosting circuit output voltage, said boosting circuit boosting said input voltage toward a target voltage as said boosting circuit output voltage, said target voltage having a voltage width with a lower limit and an upper limit,
- wherein said first power supply and said second power supply alternatively serve to provide said input voltage to said boosting circuit, such that said second power supply becomes said input voltage as said boosting circuit output voltage approaches said upper limit and said first power supply becomes said input voltage after said boosting circuit output voltage subsequently lowers and passes through said lower limit, thereby said boosting circuit output voltage is substantially kept within said voltage width.

16. The power supply circuit of claim 15, wherein said boosting circuit comprises a plurality of switches to achieve the boosting of the input voltage, said plurality of switches being synchronized with a clock signal and there are no clock signal pulse skips in switching said plurality of switches.

17. The power supply circuit of claim 15, wherein said second power supply comprises a capacitor that is charged by said first power supply when said first power supply provides said input voltage to said boosting circuit.

18. The power supply circuit of claim 15, wherein said second power supply comprises a capacitor that is charged by an output of said boosting circuit.

19. The power supply circuit of claim 15, wherein said upper limit and said lower limit result from a hysteresis characteristic of a comparator that compares a measurement of said boosting circuit output voltage with a reference voltage.

* * * * *